(12) United States Patent
Chang

(10) Patent No.: US 7,493,032 B2
(45) Date of Patent: Feb. 17, 2009

(54) CAMERA MODULE

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 432 days.

(21) Appl. No.: 11/384,457

(22) Filed: Mar. 20, 2006

(65) Prior Publication Data
US 2006/0216018 A1    Sep. 28, 2006

(30) Foreign Application Priority Data
Mar. 25, 2005   (CN) ................. 2005 1 0033848

(51) Int. Cl.
G03B 17/00 (2006.01)
G03B 15/00 (2006.01)
G02B 17/00 (2006.01)
(52) U.S. Cl. ................. 396/72; 396/351; 359/726; 359/727; 348/345
(58) Field of Classification Search ............ 396/72, 396/76, 79, 351–352; 359/694, 726–728, 359/793; 348/345, 349–350
See application file for complete search history.

(56) References Cited

U.S. PATENT DOCUMENTS

| 6,754,446 B2 * | 6/2004 | Hagimori et al. ............. 396/72 |
| 2005/0046740 A1 * | 3/2005 | Davis ........................ 348/373 |
| 2006/0023229 A1 * | 2/2006 | Watkins et al. ............. 356/601 |

* cited by examiner

*Primary Examiner*—Bot LeDynh

(57) ABSTRACT

A camera module (100) includes a housing (110), a lens (120), an optical group (130), a drive mechanism (160) and two image sensors (180, 190). The optical group includes a first and a second mirror (132, 134) respectively having a reflective surface (133, 135) and a middle lens (136). The drive mechanism moves the first mirror between a first and a second position. The second reflective surface of the second mirror faces being oriented so as to be able to reflect light to the second image sensor. When the first mirror is in the first position, the first reflective surface is oriented so as to be able to reflect light to the first image sensor. When the first mirror is in the second position, the first reflective surface is oriented so as to allow the light to pass through the middle lens and reach the second mirror.

14 Claims, 4 Drawing Sheets

CAMERA MODULE

This application claims foreign priority based on Chinese Patent Application No. 200510033848.5, filed Mar. 25, 2005, the content of which is incorporated herein by reference in its entirety.

BACKGROUND OF THE INVENTION

1. Field of the Invention

The present invention generally relates to camera modules and, more particularly, to a camera module applied to a portable electronic device such as a mobile phone or a PDA (personal digital assistant).

2. Discussion of the Related Art

With the rapid development of multimedia technology, use of digital devices such as digital still cameras ("still cameras") and digital video cameras ("video cameras") has become wide-spread in many countries. Mobile phones have both improved in quality and in the number of functions they can perform. Therefore, digital devices performing a wide variety of function have been combined with mobile phones.

Consumers expect such still cameras and video cameras to provide high imaging quality. As with film-based cameras, the ability to zoom is a necessary function for achieving high image quality at large imaging distances. Generally, there are two kinds of zoom methods, an optical zoom and a digital zoom. Imaging quality tends to be much poorer when digital zooming is used than when using an optical zoom. Thus, in order to satisfy market demand, camera lenses of digital cameras should have an optical zoom function.

A camera module typically has at least two lenses and most of optical zoom functions are achieved by changing a distance between lenses and thus needs to extend out some distance from the surface of a portable electronic device, this means that the camera module can easily be damaged. Furthermore, the lenses are usually engaged with a barrel by a screw thread. Engagement between the lenses and the barrel must be very accurate in order to zoom precisely. Thus, the barrel and the lenses are difficult to manufacture to such rather exact specifications. If the screw thread associated with the barrel is damaged, the camera module will not zoom precisely.

What is needed, therefore, is a camera module, which has optical zoom function and overcomes the above-described problems.

SUMMARY OF THE INVENTION

In one embodiment thereof, a camera module comprises a housing, a lens, an optical group, a drive mechanism and two image sensors. The housing defines a cavity therein and has an open end. The lens is mounted adjacent to the open end of the housing. The optical group includes a first mirror having a first reflective surface, a middle lens and a second mirror having a second reflective surface. The drive mechanism moves the first mirror from a first position to a second position. The first and second image sensors are fixed on a sidewall inside the housing. The first and second mirrors and the middle lens are mounted in the cavity of the housing. The first and second mirrors are set at two sides of the middle lens. The second reflective surface of the second mirror faces being oriented so as to be able to reflect light to the second image sensor. When the first mirror is at its first position, the first reflective surface of the first mirror is oriented so as to be able to reflect light to the first image sensor. When the first mirror is at its second position, the first reflective surface of the first mirror is oriented so as to allow the light to pass through the middle lens and reach the second mirror.

In another embodiment thereof, a camera module comprises a housing, a lens, an optical group, a drive mechanism and two image sensors. The housing defines a cavity therein and has an open end. The lens is mounted adjacent to the open end of the housing. The optical group has a first mirror having a first reflective surface and a second mirror having a second reflective surface. The drive mechanism moves the first mirror from a first position to a second position. The two first and second image sensors are fixed on a sidewall inside the housing. The first and second mirrors and the middle lens are mounted in the cavity of the housing and the second reflective surface is a surface farther from the first mirror than an opposite surface of the second mirror. The second reflective surface of the second mirror faces being oriented so as to be able to reflect light to the second image sensor. When the first mirror is at its first position, the first reflective surface of the first mirror faces being oriented so as to be able to reflect light to the first image sensor. When the first mirror is at its second position, the first reflective surface of the first mirror is oriented so as to allow the light to reach the second mirror.

Other advantages and novel features of preferred embodiments of the present invention will become more apparent from the following detailed description thereof when taken in conjunction with the accompanying drawings:

BRIEF DESCRIPTION OF THE DRAWINGS

Many aspects of the camera module can be better understood with reference to the following drawings. The components in the drawings are not necessarily to scale, the emphasis instead being placed upon clearly illustrating the principles of the camera module. Moreover, in the drawings, like reference numerals designate corresponding parts throughout the several views.

DETAILED DESCRIPTION OF PREFERRED EMBODIMENTS

A camera module is disclosed to be used to applied in portable electronic devices such as mobile phones and PDAs, yet could be equally useful in "stand-alone" digital-based optical devices.

Figure 1:
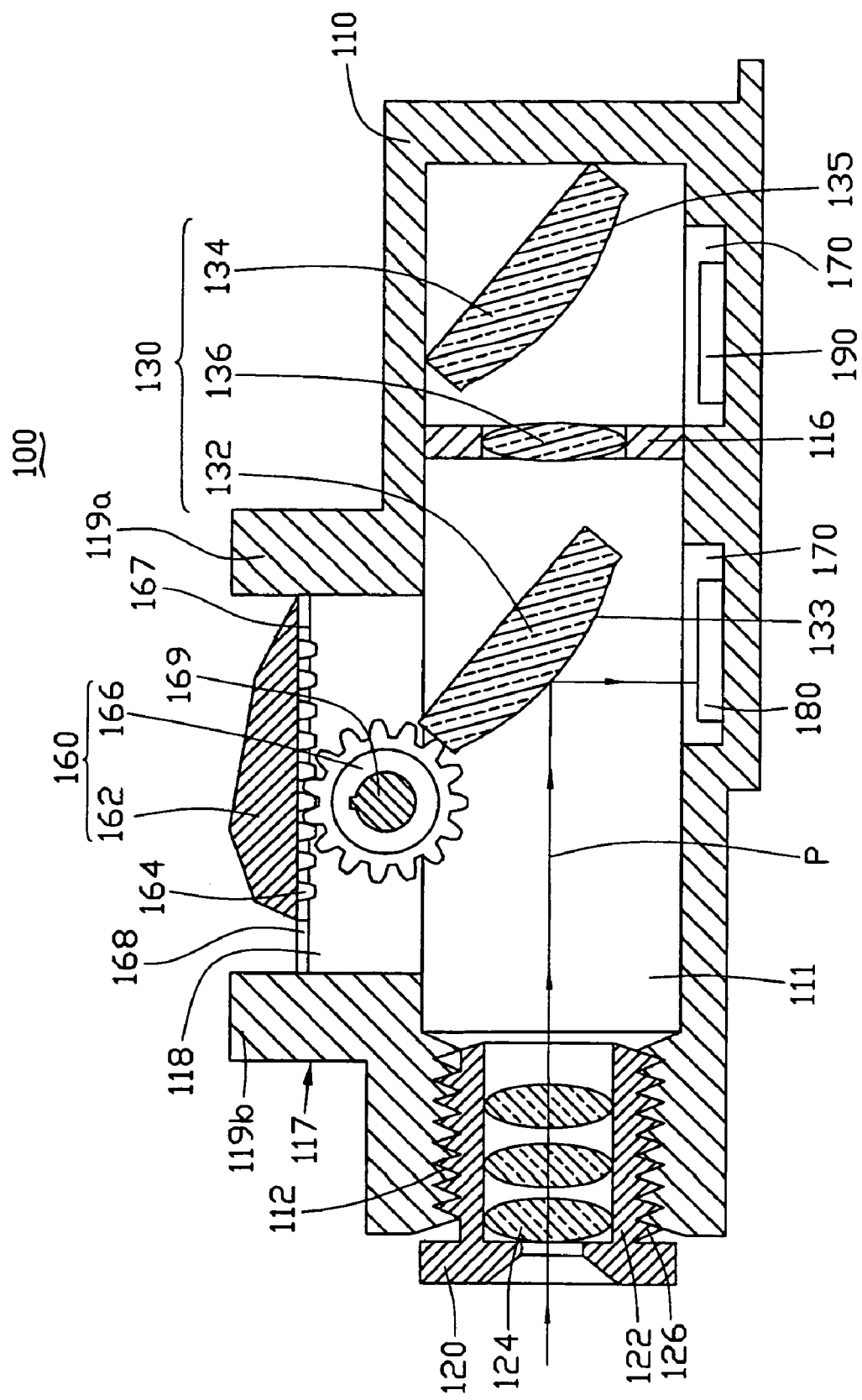
FIG. 1 is an assembled, cross-sectional view of a camera module in accordance with a first preferred embodiment of the present invention with a first focal length.

Referring to FIG. 1, a first embodiment of a camera module 100 includes a housing 110, a lens unit 120, an optical group 130, a drive mechanism 160, a first image sensor 180, and a second image sensor 190. The camera module 100 could be of the "still" and/or the video variety.

The housing 110 has a cylinder-shaped cavity 111 defined therein. One end of the housing 110 is closed and an opposite end is open. The open end is configured for receiving the lens unit 120 therein. An inner screw thread 112 is defined in an inner periphery of the housing 110 at the open end thereof, so that the lens unit 120 can be mounted thereat in a screwing manner. An annular ring 116 is mounted in the inner periphery of the housing 10 adjacent to, but spaced from the closed end thereof. A protrusion 117 is formed on an outside of a sidewall of the housing 110 and effectively extends away from this sidewall. An opening 118 is defined in the protrusion 117. Two opposite walls of the protrusion 117 are higher than other two walls, thereby forming two blocks 119a and 119b thereon. The opening 118 is connected to the cavity 111 of the housing 110. Two receiving slots 170 are defined in the housing 110 opposite to the sidewall defining the opening 118, and the two receiving slots 170 are respectively arranged at two sides of the ring 116. The image sensors 180, 190 are set in the receiving slots 170 respectively, and a distance between the first image sensor 180 and the open end is smaller than that between the second image sensor 190 and the open end.

The lens unit 120 includes a barrel 122 and a lens group 124 mounted in the barrel 122. An outside screw thread 126 is defined in an outer periphery of the barrel 122. The lens unit 120 is assembled in the cavity 111 of the housing 110 and engages with the inner screw thread 112 of the housing 110 to hold the main lens/focus unit 120 in alignment within the housing 110.

The optical group 130 includes a first mirror 132, a second mirror 134 and a middle lens 136. The optical group 130 is configured for directing light from the lens unit to the first image sensor 180 or second image sensor 190. In the first embodiment, the first mirror 132 acts as a first light directing unit for reflecting light to the first image sensor 180, and the second mirror 134 and the middle lens 136 acts as a second light directing unit for directing light to the second image sensor 190. The first mirror 132 includes a first reflective surface 133 and the second mirror 134 includes a second reflective surface 135. The middle lens 136 is mounted in the ring 116. The first and second mirrors 132, 134 are set in the cavity 111 of the housing 110, and are respectively arranged at two sides of the middle lens 136. A distance between the first mirror 132 and the open end of the housing 110 is smaller than that between the second mirror 134 and the open end. The first reflective surface 133 of the first mirror 132 faces the first image sensor 180 and the second reflective surface 135 of the second mirror 134 faces the second image sensor 190, and a surface opposite to the first reflective surface 133 of the first mirror 132 and the second reflective surface 135 both face the middle lens 136. The first mirror 134 is fixed on the housing 110 by pasting with adhesive or other means. The middle lens 136 is either a convex mirror or a concave mirror.

When focused, only one of the first and second light directing units is selected for directing the light to a given image sensor at a time. This selection is achieved by operation of the drive mechanism 160. In this embodiment, the drive mechanism 160 is essentially a rack and pinion device that particularly includes a push button 162 and a gear 166. The push button 162 defines a plurality of teeth 164 on one surface thereof A width (the width can be shown in a cross-sectional view taken along a line perpendicular to an axis of the barrel 122 of FIG. 1 crossing the push button 162) of the opening 118 of the protrusion 117 is smaller than that of the push button 162 but larger than that of the teeth 164. A strip 167 is formed at each of two sides of the teeth 164 and a rail 168 is defined in each of two lower walls of the protrusion 117 to engage with the strips 167. The push button 162 is slidably mounted on the protrusion 117. The gear 166 is set partly in the opening 118 and partly in the cavity 111 of the housing 110, and a spindle 169 is rotatably assembled in the protrusion 117. A hole (not shown) is defined in each lower wall of the protrusion 117 of the housing 110 for receiving the spindle 169. The first mirror 132 is fixed on the gear 166 (e.g., on one of the teeth thereof) by pasting with adhesive, welding, or other manners. The teeth 164 of the push button 162 engage with the gear 166, thereby allowing adjustment of the angular position of the gear 166 by changing the linear position of the push button 162.

In use, light enters the barrel 122 of the lens unit 120 and passes through the lens group 124 along an optical path P. When the push button 162 is at its first position, that is, resting against one block 119a, the first reflective surface 133 of the first mirror 132 is in its mirror-down position and thus faces the lens unit 120 and is in the optical path P. Then the light path is altered by being reflected by the first reflective surface 133 of the first mirror 132, and then is received by the first image sensor 180. In this situation, the first light directing unit, that is, the first mirror 132, is selected for directing light, and an effective focal length of the camera module 100 is same as the focal length of the lens group 124.

Figure 2:
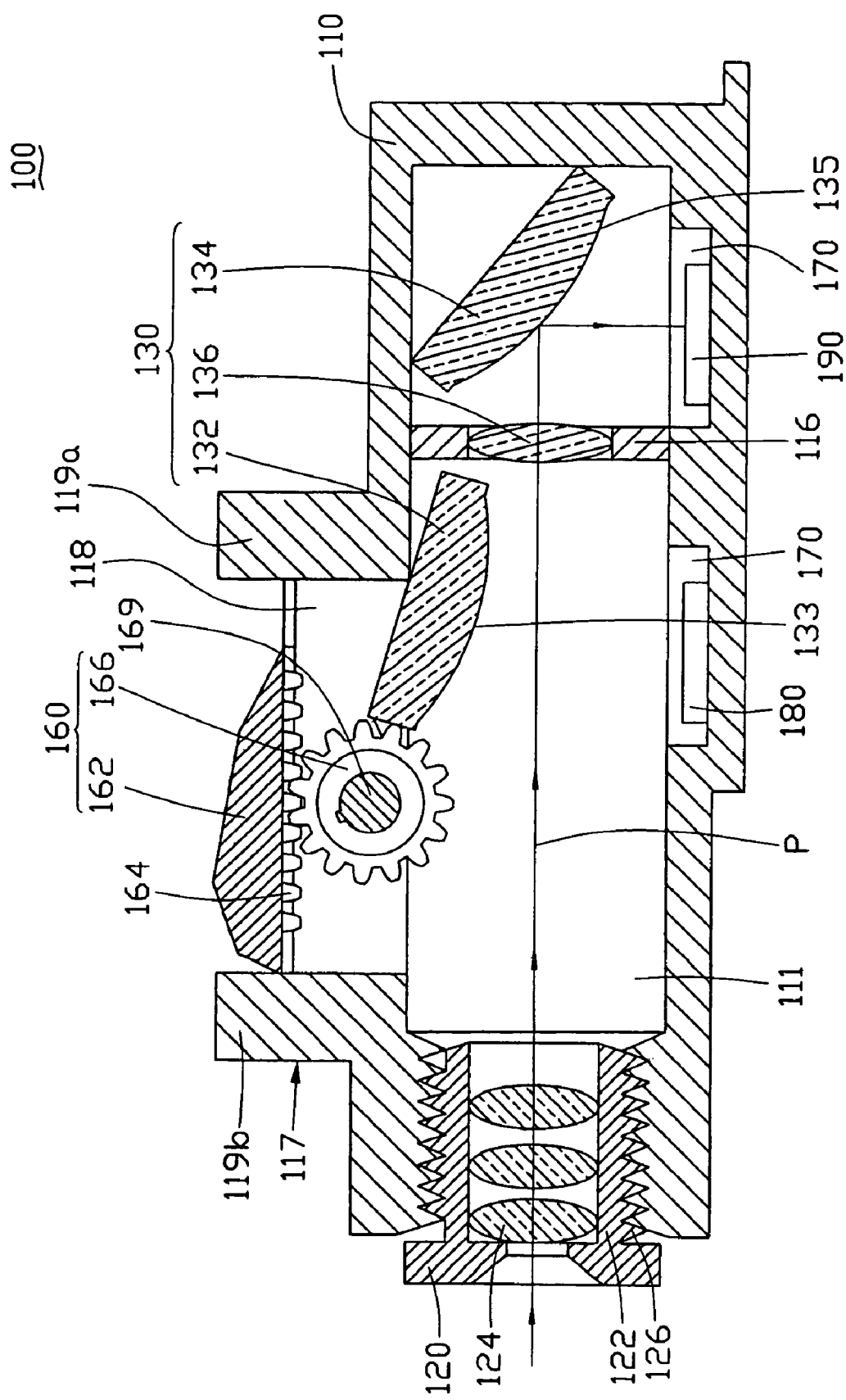
FIG. 2 is similar to FIG. 1, but showing the camera module with a second focal length.

Referring to FIG. 2, to obtain a zoomed picture, the push button 162 is pushed to its second position, that is, the push button 162 resting against another block 119b, to make the first mirror 132 rotate with the gear 166 round the spindle 169 to a position (i.e., a mirror-up position) offsetting from the optical path P, the first reflective surface 133 of the first mirror 132 does not face the lens unit 120, thus allowing the light to reach the second light directing unit. Next, the light passes through and is refracted by the middle lens 136, and then the light path is altered by being reflected by the second reflective surface 135 of the second mirror 134. Finally, the light is received on the second image sensor 190. When focused, an effective focal length of the camera module 100 is a combined focal length of the lens group 124 and the middle lens 136. As such, an effective focal length of the camera module 100 is changed by the light passing through the middle lens 136 in the latter condition, as compared with the former condition where the lights do not pass through the middle lens 136. Thus, the camera module 100 has an optical zoom function.

Figure 3:
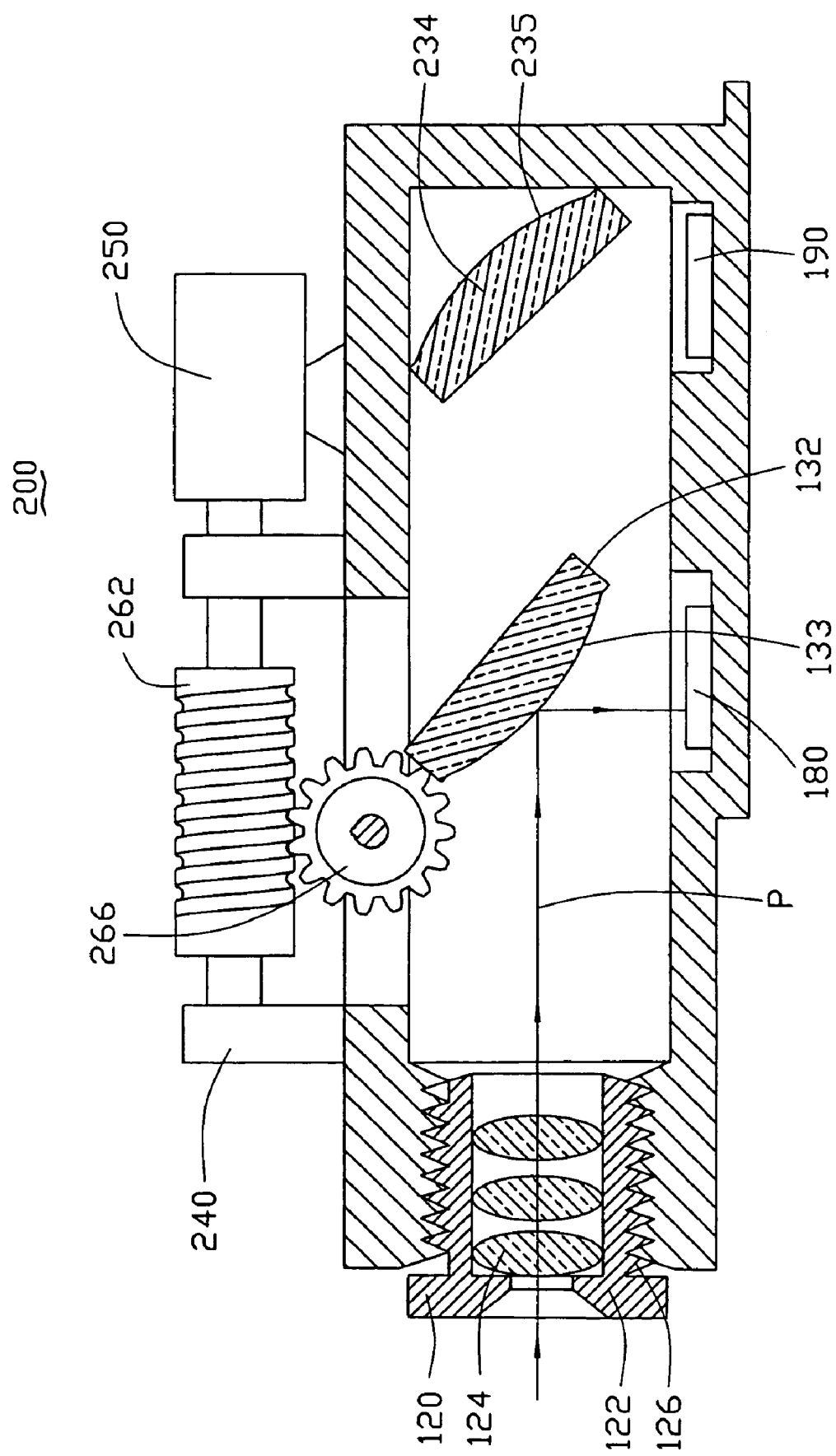
FIG. 3 is an assembled, partly cross-sectional view of a camera module in accordance with a second preferred embodiment of the present invention with a first focal length.

Referring to FIG. 3, in a second embodiment, all other structure of the camera module 200 is the same as in the camera module 100 of the first embodiment except that an engagement of the teeth 164 of the push button 162 with the gear 166 is replaced by an engagement of a worm 262 (i.e., a worm gear) with a worm wheel 264, and the protrusion 117, the ring 116 and the middle lens 136 are all omitted. Also, the second mirror 134 and the middle lens 136 are replaced by a third mirror 234 as the second light directing unit. Two stands 240 are formed on two sides of the opening 118. The worm 262 is supported by the stands 240. The third mirror 234 is an optical lens including a third reflective surface 235. The third reflective surface 235 faces the second image sensor 190 and is further from the lens unit 20 than the opposite surface of the third mirror 234. The worm 262 is driven by a motor 250. Alternatively, the worm 262 can also be manually driven (not shown).

As shown in FIG. 3, when the first mirror 132 faces the lens unit 120 (i.e., in the mirror-down position), light enters the barrel 122 of the lens unit 120 and passes through the lens group 124. Then the light is reflected by the first reflective surface 133 of the first mirror 132, and is then received by the first image sensor 180.

Figure 4:
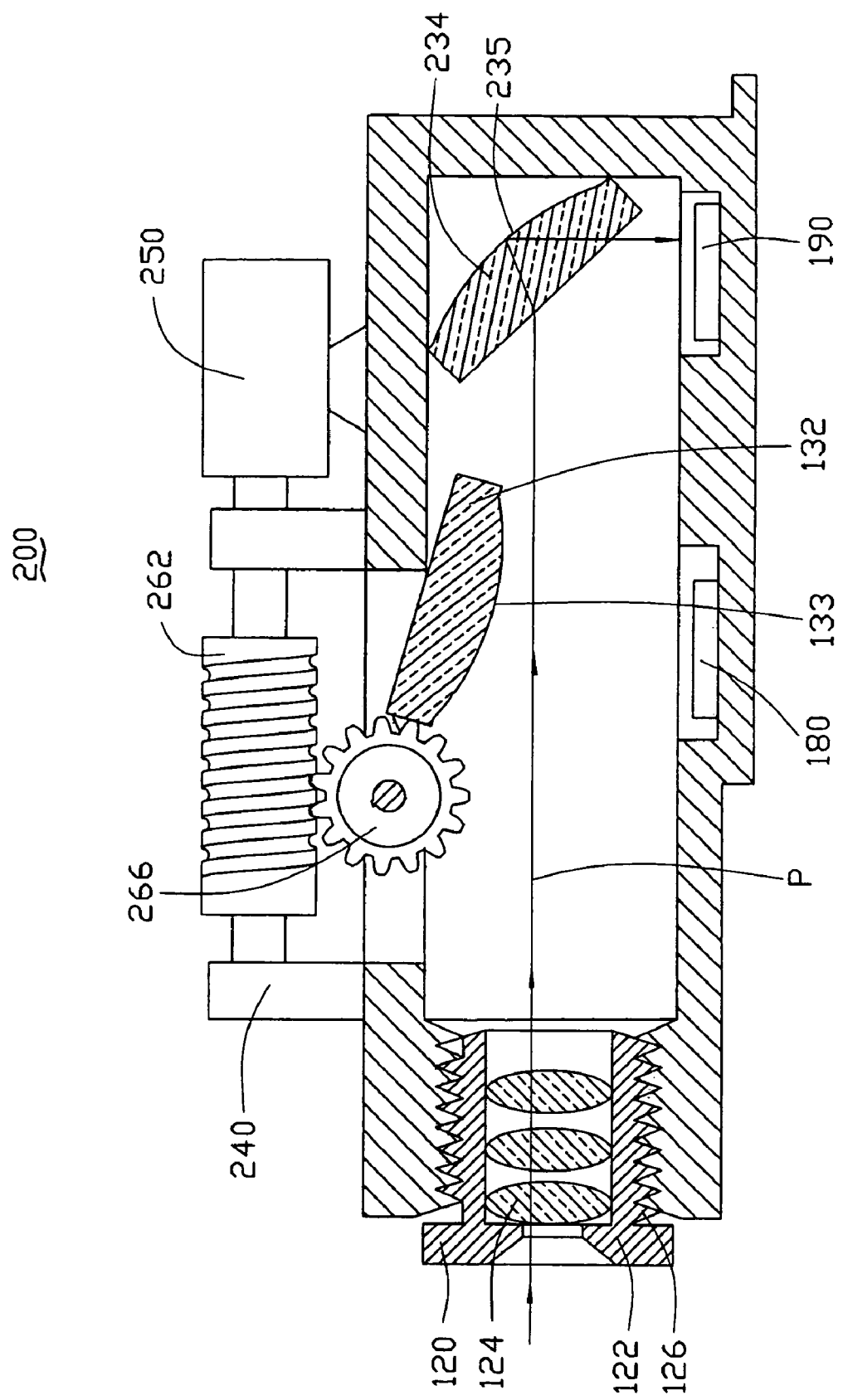
FIG. 4 is similar to FIG. 3, but showing the camera module with a second focal length.

Referring to FIG. 4, the worm 262 is rotated by the motor 250 so as to cause the worm wheel 266 to rotate. The first mirror 132 is rotated to a position (i.e., the mirror-up position) not facing the lens unit 120. In this situation, light enters the barrel 122 of the lens unit 120 and passes through the lens group 124. Next, the light passes through the third mirror 234 for being refracted and then reflected by the third reflective surface 235 of the third mirror 234, and is then received by the second image sensor 190. As such a focal length of the camera module 200 is changed as light is refracted via the third mirror 234 in the latter condition and does not pass the third mirror 234 in the former condition.

In alternative embodiments, the drive mechanism 160 can be appropriate structure that can drive the first mirror 132 or other elements of the optical group to move, either manually or electrically. The reflective surfaces 133, 135 and 235 are curved surfaces or flat surfaces. In the case of the third mirror 234, if the reflective surface 235 is flat, then the opposing surface thereof should be curved and/or a middle lens 136 should be provided to allow for further focusing of the light if a telephoto/zoom feature is desired. The number of the first mirrors 132 and the number of the middle lenses 143 can be one or more. If more than one second light directing unit is used, the focal lengths of the camera module 100, 200 can be changed to different lengths. A layer of reflecting film can be coated on the first, second, and third reflective surfaces 133, 135, and 235. It is also to be understood that certain features of the two embodiments could be interchanged and/or added to the other (e.g., the drive mechanism of the second embodiment could replace that in the first; the ring 116 and middle lens 136 could be employed in the second embodiment) and not depart from the spirit or scope of the present invention.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A camera module comprising:
   a plurality of image sensors including a first image sensor and a second image sensor; and
   a plurality of light directing units including a first light directing unit and a second light directing unit for directing light to the first and second image sensors, respectively, the light directing units being configured such that when focused, one of the first and second light directing units is selected for directing the light to a given image sensor at a time.

2. The camera module as claimed in claim 1, wherein the camera module further comprises a lens unit configured for directing light to the light directing units along an optical path, and the first light directing unit is disposed between the lens unit and the second light directing unit.

3. The camera module as claimed in claim 2, wherein the camera module further comprises a driving mechanism mounted to the first light directing unit, configured for driving the first light directing unit to move between a first position on the optical path and a second position offsetting from the optical path.

4. The camera module as claimed in claim 2, wherein the image sensors are located offsetting from the optical path.

5. The camera module as claimed in claim 3, further comprising a housing having a cavity defined therein, the housing receiving the light directing units and the image sensors therein.

6. The camera module as claimed in claim 1, wherein the focal length of the camera module that selects the first light directing unit is distinct from to focal length of the camera module that selects the second light directing unit.

7. The camera module as claimed in claim 3, further comprising a middle lens positioned between the first and second light directing units so that when the first light directing unit moves to the second position, the middle lens is positioned on the optical path and directs light to the second light directing unit.

8. The camera module as claimed in claim 7, wherein each of the first and second light direct units can be a mirror, or an optical lens having a reflective surface.

9. The camera module as claimed in claim 5, wherein the housing forms a protrusion on an outside sidewall thereof, and the housing defines an opening in the protrusion communicating with the cavity.

10. The camera module as claimed in claim 9, wherein the protrusion comprises two opposite higher sidewalls each forming a block thereon and two opposite lower sidewalls, a spindle being rotatably assembled in the protrusion.

11. The camera module as claimed in claim 10, wherein the drive mechanism comprises a push button having a plurality of teeth and a gear, the push button is slidably mounted on the protrusion of the housing, the gear is supported by the spindle and engages with the teeth of the push button, a movement between the two blocks of the push button makes the first light directing unit fixed on the gear move between to first and second positions.

12. The camera module as claimed in claim 5, wherein the housing defines an opening in one sidewall thereof and the opening communicates with the cavity of the housing.

13. The camera module as claimed in claim 12, wherein a spindle is rotatably mounted on the housing, and each of the two sides of the opening forms a stand.

14. The camera module as claimed in claim 13, wherein the drive mechanism comprises a worm and a worm wheel, the worm is supported by the stands, the worm wheel is rotatably supported by the spindle and engaged with the worm, the first light directing unit is fixed on the worm wheel so that to movement of the worm can drive the first light directing unit between the first and second positions.

* * * * *